United States Patent
Zhong et al.

(10) Patent No.: US 12,416,328 B2
(45) Date of Patent: Sep. 16, 2025

(54) HEAVY-DUTY THRUST WASHER WITH LUBRICANT PASSAGES FOR E-AXLE

(71) Applicant: Schaeffler Technologies AG & Co. KG, Herzogenaurach (DE)

(72) Inventors: Guihui Zhong, Charlotte, NC (US); James Brown, Rock Hill, SC (US); Florin Muscas, Sterling Heights, MI (US); Joseph T. Griffin, Monroe, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 127 days.

(21) Appl. No.: 18/471,516

(22) Filed: Sep. 21, 2023

(65) Prior Publication Data

US 2025/0102014 A1    Mar. 27, 2025

(51) Int. Cl.
  *F16C 19/38* (2006.01)
  *F16C 25/08* (2006.01)
  *F16C 33/66* (2006.01)

(52) U.S. Cl.
  CPC ........ *F16C 19/385* (2013.01); *F16C 33/6681* (2013.01); *F16C 25/083* (2013.01)

(58) Field of Classification Search
  CPC .... F16C 19/385; F16C 19/386; F16C 25/083; F16C 33/6681
  See application file for complete search history.

(56) References Cited

U.S. PATENT DOCUMENTS

| | | | | |
|---|---|---|---|---|
| 3,516,717 | A | * | 6/1970 | Peterson ................. F01D 25/16 384/517 |
| 4,795,220 | A | * | 1/1989 | Mori ....................... F16C 27/08 384/429 |
| 5,666,644 | A | * | 9/1997 | Tanaka .................... F16C 17/04 428/548 |
| 7,594,760 | B2 | * | 9/2009 | Goss ...................... F16C 35/061 384/535 |

FOREIGN PATENT DOCUMENTS

| | | | | |
|---|---|---|---|---|
| EP | 2932113 | A1 | 10/2015 | |
| FR | 964222 | A | * 4/1948 | |
| FR | 2688037 | A1 | * 9/1993 | ............ F16C 25/083 |
| KR | 19980047932 | U | 9/1998 | |

* cited by examiner

*Primary Examiner* — James Pilkington
(74) *Attorney, Agent, or Firm* — Volpe Koenig

(57) ABSTRACT

A thrust washer for a bearing assembly having increased strength, decreased weight and improved oil flow for lubrication and/or cooling of the bearing assembly. The thrust washer includes an annular washer body surrounding a central axis. The washer body has first and second opposite axial sides, and each axial side includes a plurality of alternating radially-extending ridges and channels that define oil flow passageways. In one example, the thrust washer is a stamped component.

18 Claims, 8 Drawing Sheets

HEAVY-DUTY THRUST WASHER WITH LUBRICANT PASSAGES FOR E-AXLE

TECHNICAL FIELD

The present disclosure relates generally to an electric axle, and more specifically to a bearing arrangement of an electric axle assembly.

BACKGROUND

In general, electric axles (e-axle) are known structures used in motor vehicles. Electric axles include a number of components such as an electric motor, a power electronic unit, various transmission components and a differential.

E-axles with more than one drive motor are becoming more common, while demands for efficiency pushes e-axles to become increasingly compact. To meet these demands, e-axles need to become increasingly lightweight even as power and torque capacities increase. As a result, e-axle components are becoming lighter and stronger.

In a two-motor e-axle, a thrust washer is typically provided between the two differential shafts. In this position, the thrust washer can see very high thrust load and must allow lubricant to flow through with minimal resistance. Additionally, bearings of the thrust washer can shift axially in the housing under operating temperatures.

Conventional thrust washers generally include a precision machined washer body with radially-oriented oil slots machined into one of its axial faces. However, such machined washers are bulky, costly and generally do not ensure adequate lubricant flow under extreme operating conditions.

SUMMARY

Embodiments according to this disclosure provide a stamped washer with radial channels alternating on both sides of the washer for oil flow through. The channels are much bigger than the machined slots of a conventional washer and have minimal oil flow resistance. The alternating channels can also avoid blockage the housing oil hole due to axial shifting of the bearing. The channels are stamped to have minimum weight, but strong and stiff axially to support heavy thrust load.

In accordance with one aspect, a thrust washer comprises an annular washer body surrounding a central axis, the washer body having first and second opposite axial sides, each axial side including a plurality of alternating radially-extending ridges and channels.

A ridge of the first axial side can correspond to a channel of the second axial side. Each of the channels can have a U-shape cross-section having a base wall and first and second sidewalls extending from the base wall. The first and second sidewalls can be parallel to each other and extend at 90-degree angles from the base wall. The first and second sidewalls can extend from the base wall at an angle greater than 90 degrees. The ridges of each of the first and second axial sides can define contact surfaces of the first and second sides, and an areal extent of the contact surfaces of the first axial side can be equal to an areal extent of the contact surfaces of the second axial side. Each of the first and second axial sides can have, for example, between 5 and 18 channels. The thrust washer can include at least one axially-extending tab on an inner diameter thereof. The annular washer body can be stamped metal, and the metal can be heat-treated metal.

In accordance with another aspect of the present disclosure, a bearing assembly comprises a housing, first and second bearings supported in the housing, and a thrust washer supported in the housing between the first and second bearings. The thrust washer includes an annular washer body surrounding a central axis, the annular washer body having first and second axial sides, each axial side including a plurality of alternating radially-extending ridges and channels.

The housing can include at least one hole extending in a radial direction for the flow of oil to an interior of the assembly, and the thrust washer can be axially aligned with the at least one hole. A ridge of the first axial side of the thrust washer can correspond to a channel of the second axial side. Each of the channels of the thrust washer can have a U-shape cross-section having a base wall and first and second sidewalls extending from the base wall. The first and second sidewalls of the thrust washer can be parallel to each other and extend at 90-degree angles from the base wall. The first and second sidewalls of the thrust washer can extend from the base wall at an angle greater than 90 degrees. The ridges of each of the first and second axial sides of the thrust washer can define contact surfaces of the first and second sides engaged with respective surfaces of the first and second bearings, and an areal extent of the contact surfaces of the first and second sides can be equal. The thrust washer can include at least one axially-extending tab on an inner diameter thereof, the at least one axially extending tab cooperating with a surface of the first or second bearing to locate the thrust washer. Each of the first and second axial sides of the thrust washer can have between 5 and 18 channels. The first and second bearings can be tapered roller bearings.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
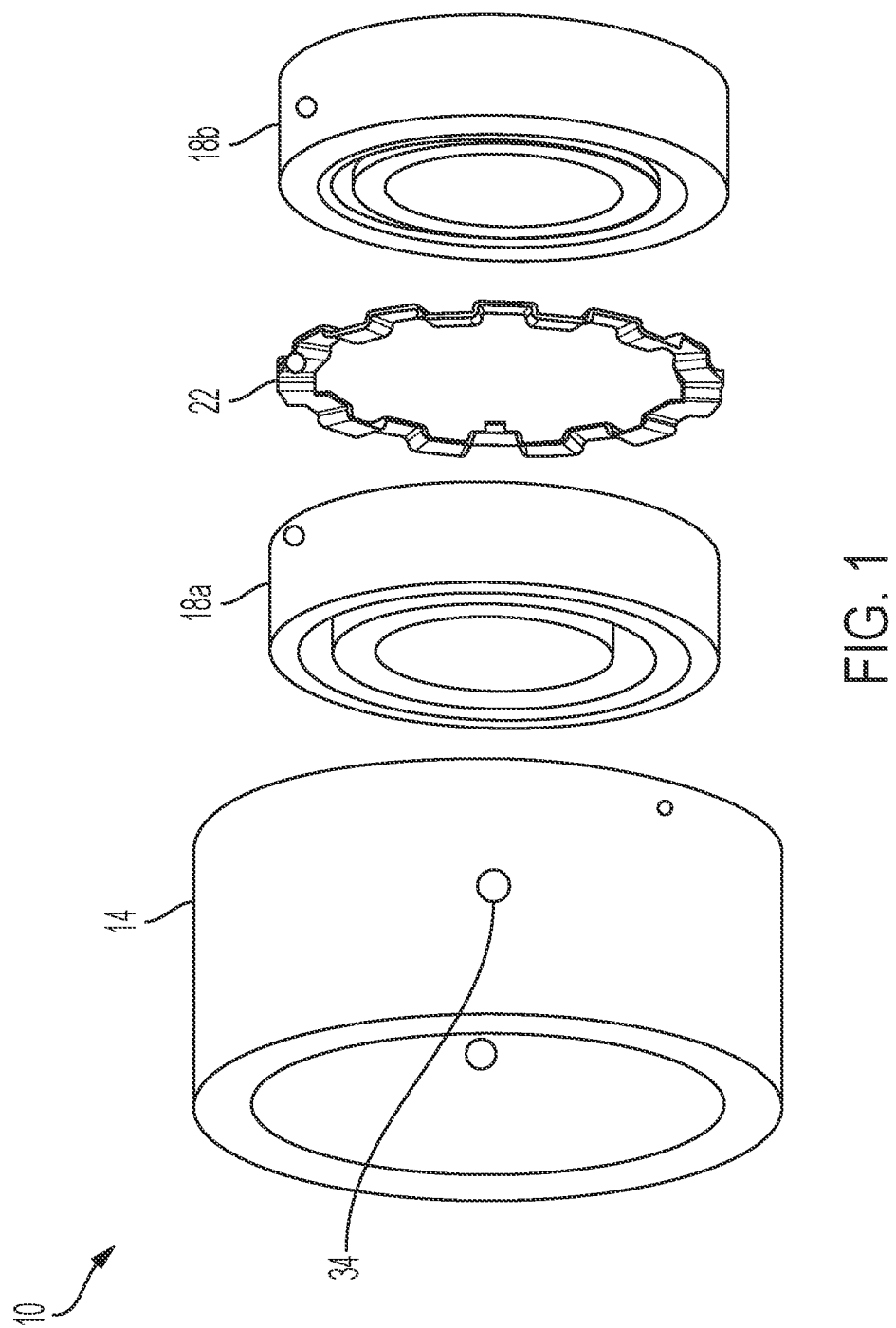
FIG. 1 is an exploded view of an exemplary bearing assembly in accordance with the present disclosure.

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Embodiments according to this disclosure provide a thrust washer for a bearing assembly having increased strength, decreased weight and improved oil flow for lubrication and/or cooling of the bearing assembly. The thrust washer includes an annular washer body surrounding a central axis. The washer body has first and second opposite axial sides, and each axial side includes a plurality of alternating radially-extending ridges and channels that define oil flow passageways.

Figure 2:
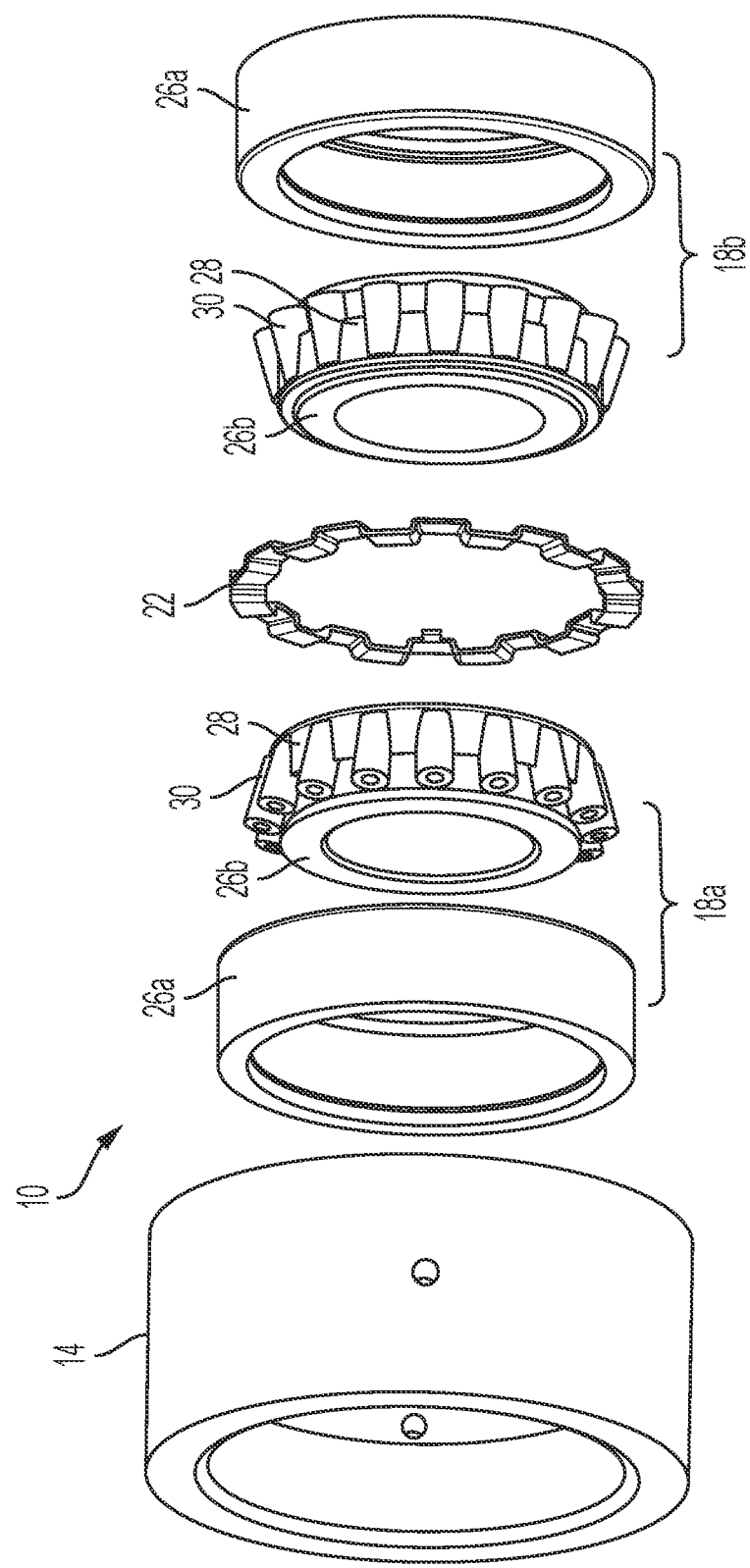
FIG. 2 is a further exploded view of the bearing assembly of FIG. 1.
Figure 4:
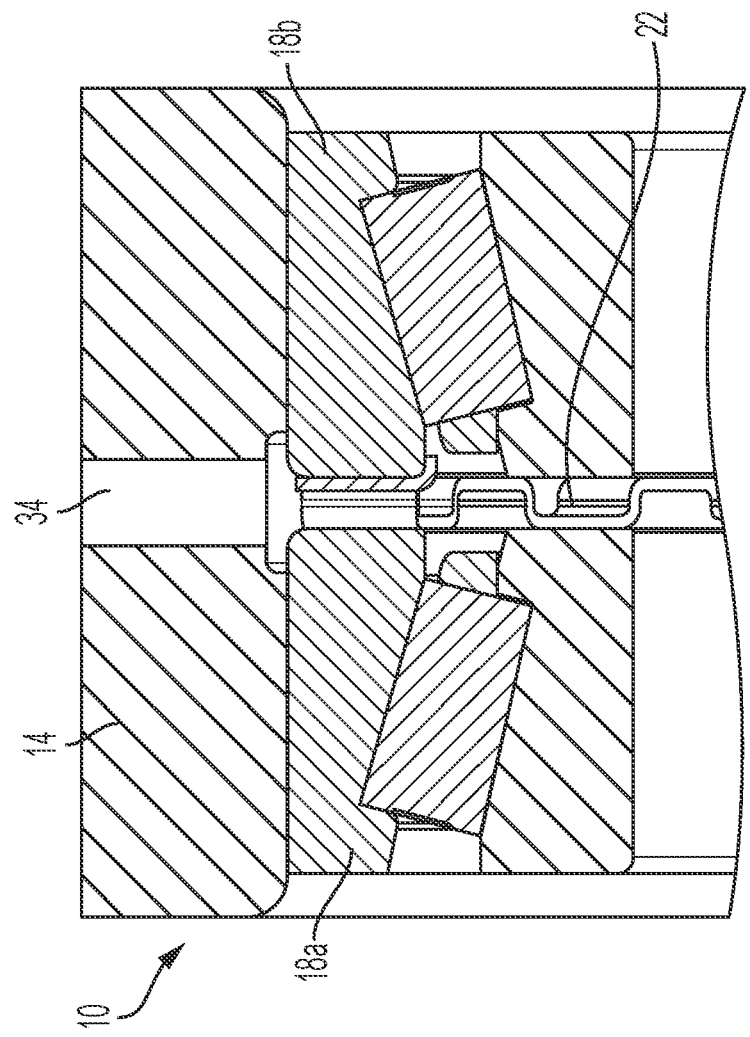
FIG. 4 is an enlarged portion of FIG. 3.
Figure 3:
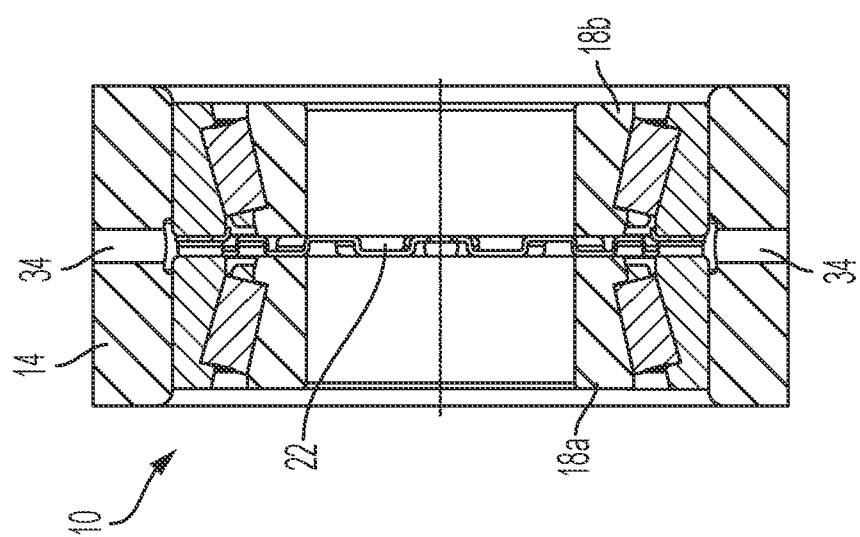
FIG. 3 is a cross-sectional view taken through a diameter of the bearing assembly of FIG. 1.
Figure 6:
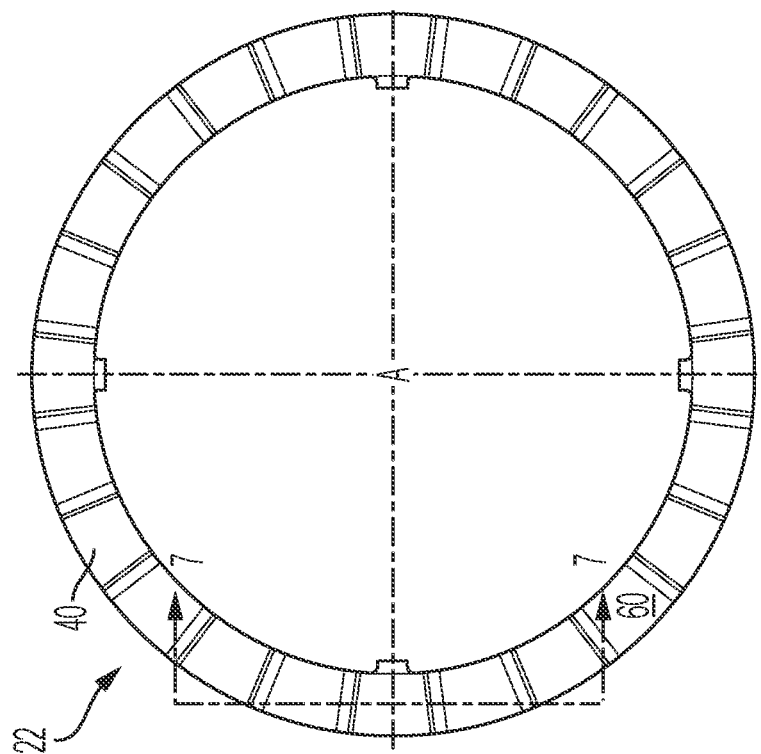
FIG. 6 is a plan view of the thrust washer of FIG. 5.
Figure 5:
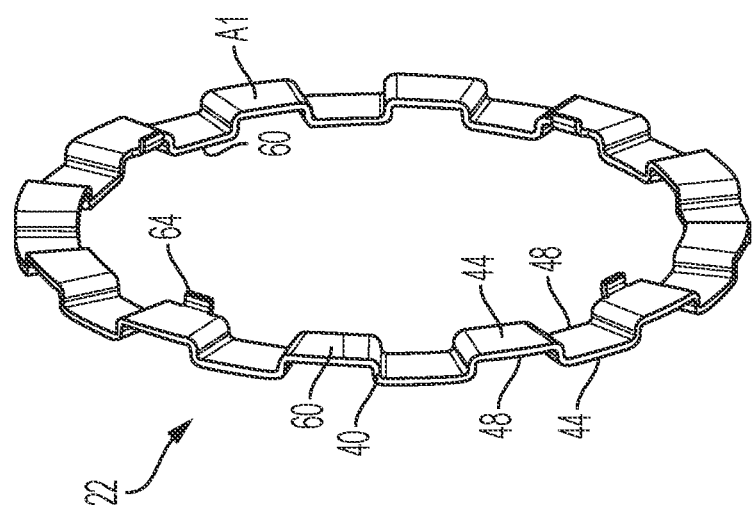
FIG. 5 is a perspective view of an exemplary thrust washer in accordance with the present disclosure.
Figures 7, 8:
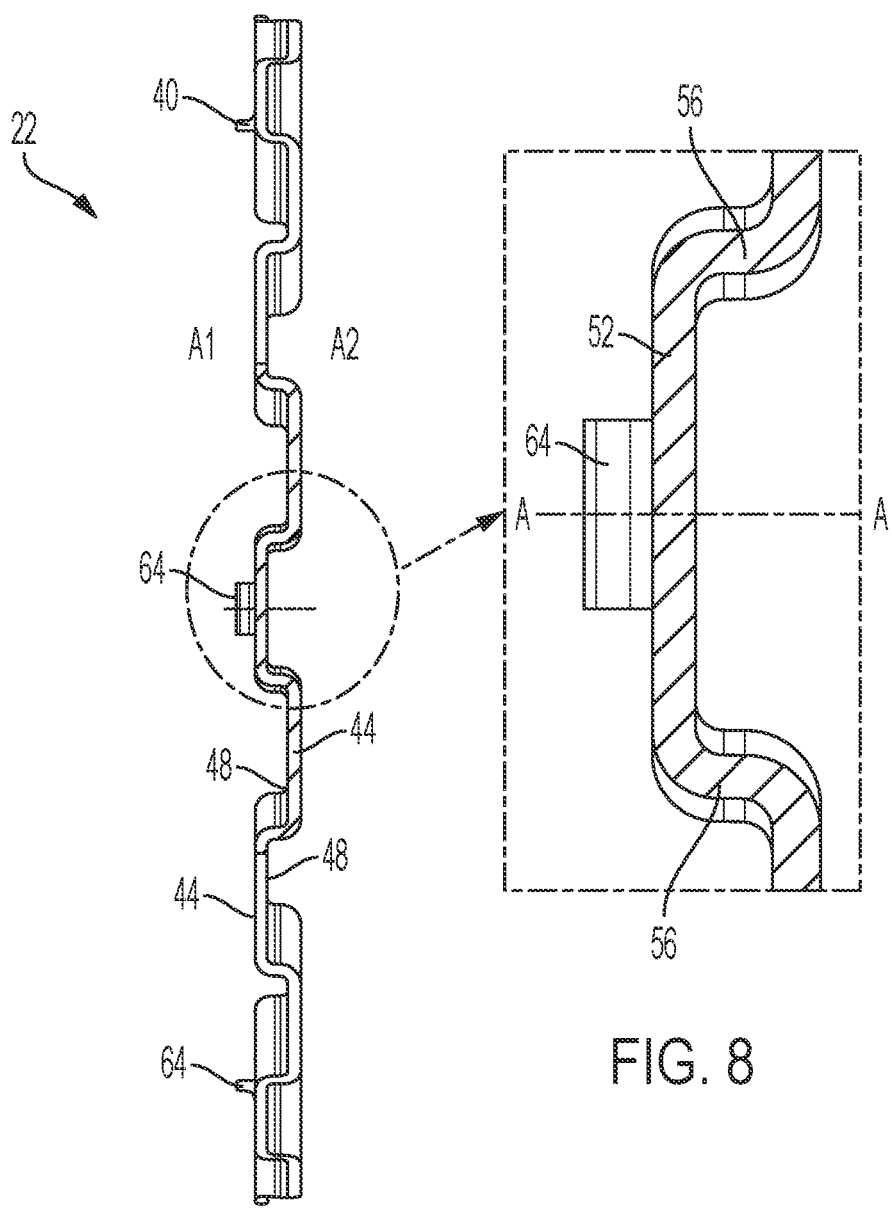
FIG. 7 is a partial cross-sectional view taken along the line 7-7 in FIG. 6.
FIG. 8 is an enlarged portion of FIG. 7.

Referring to FIGS. 1-8, and initially to FIGS. 1-3, an exemplary bearing assembly in accordance with the present disclosure is illustrated and identified generally by reference numeral 10. The bearing assembly 10 includes a housing 14, first and second bearings 18a and 18b, and a thrust washer 22. The bearings 18a and 18b in the illustrated example are tapered roller bearings having an outer ring 26a, an inner ring 26b, and a cage 28 supporting rolling elements 30. It will be appreciated that aspects of the present disclosure are applicable to other bearing types and other assemblies.

The housing 14 includes holes or ports 34 for admitting oil to an interior of the housing 14. The thrust washer 22 is interposed between the bearings 18a and 18b and generally aligned in the axial direction with the holes 34. The bearings 18a and 18b may be slip fit within the housing 14 to allow for limited axial movement during operation.

With additional reference to FIGS. 5-8, the thrust washer 22 includes a thrust washer body 40. The body 40 is generally annular and surrounds a central axis A-A. The body 40 includes first and second axial sides A1 and A2 (see FIG. 7). Each axial side includes a plurality of alternating radially-extending ridges 44 and channels 48. In the illustrated example, the body 40 is a stamped metal component having a plurality of bends that define the ridges 44 and channels 48, whereby a ridge 44 of the first axial side A1 corresponds to a channel 48 of the second axial side A2. In this regard, a ridge 44 of one axial side is a channel 48 of the other axial side.

Each ridge/channel pair generally has a U-shape cross-section having a base wall 52 and first and second sidewalls 56 extending from the base wall 52. The first and second sidewalls 56 in this embodiment are parallel to each other and extend at 90-degree angles from the base wall 52. In other examples, the side walls 56 can be non-parallel.

Axially outer surfaces 60 of each ridge 44 define contact surfaces of the first and second axial sides A1 and A2. Corresponding surfaces of the bearings 18a and 18b engage the contact surfaces 60 of each axial side A1 and A2 of the thrust washer 22. In general, an areal extent of the contact surfaces 60 of the first axial side A1 is equal to an areal extent of the contact surfaces 60 of the second axial sides A2.

The thrust washer 22 can have a larger or smaller number of ridges/channels than the number illustrated. In one example, the thrust washer includes between 5 and 18 ridges/channels.

The thrust washer 22 further includes axially-extending tabs 64 on an inner diameter thereof. In this embodiment, the axially-extending tabs 64 extend from an inner diameter of at least some of the ridges 44 of the second axial side A2. The tabs 64 are configured to be received by the bearing 18b for locating the thrust washer 22 within the housing 14.

It should now be appreciated that the channels 48 minimize oil flow resistance. The alternating channels 48 can avoid blockage of the oil holes 34 of the housing 14 in circumstances where the bearings 18a/18b shift axially. The channels 48 are stamped to have minimum weight, but strong and stiff axially to support heavy thrust load. In one example, a thrust washer having a stock thickness of 0.8 mm or thicker can support thrust loads of, for example, 30 kN. The resulting thrust washer 22 is lightweight and economical and, thus, well-suited to compact, high power density e-Axle applications.

The additional tabs 64 of the thrust washer 22 help solve the washer piloting problem. These tabs 64 can be guided by one or both of the bearing outer rings 26a flange inside diameter to maintain the position of the thrust washer 22 The piloting tabs 64 can either have prescribed minimum clearance to the tapered roller bearing outer ring inside diameter or have a slight interference with it.

In some examples, the thrust washer 22 can be stamped from steel sheets, such as SAE 1075 or ck75, then heat treated for higher strength.

The thrust washer 22 is more flexible than a solid washer and has better shock absorbing capability.

Figures 9, 10:
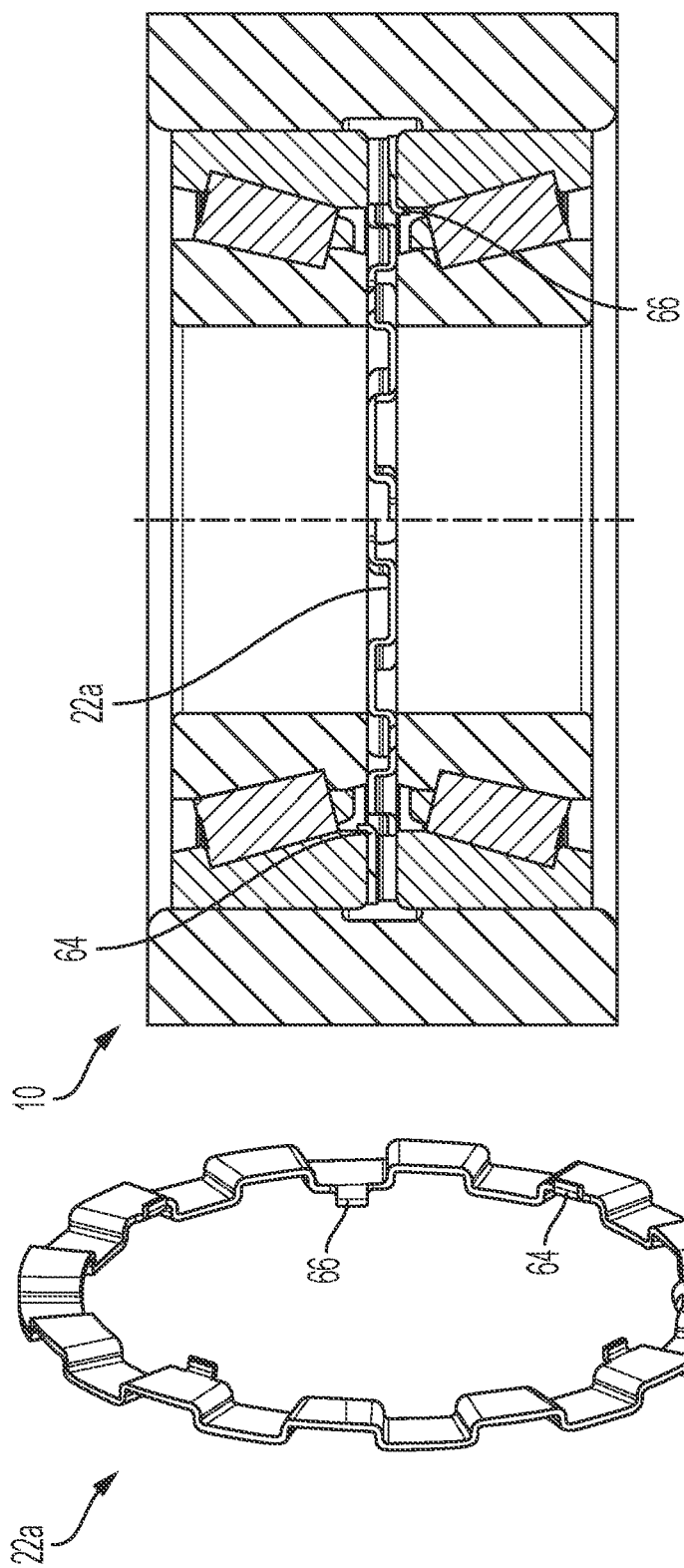
FIG. 9 is a perspective view of another exemplary thrust washer in accordance with the present disclosure.
FIG. 10 is a cross-sectional view of a bearing assembly including the thrust washer of FIG. 9.
Figure 13:
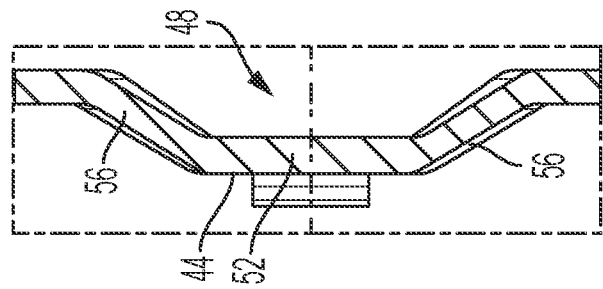
FIG. 13 is an enlarged portion of FIG. 12.
Figure 12:
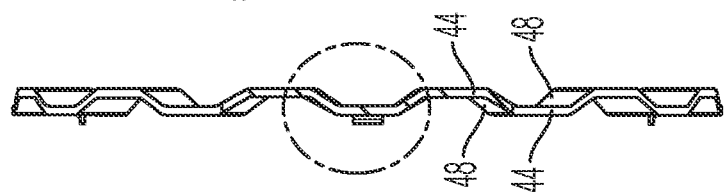
FIG. 12 is a partial cross-sectional view of the thrust washer of FIG. 11.
Figure 11:
FIG. 11 is a perspective view of another exemplary thrust washer in accordance with the present disclosure.
Figure 14:
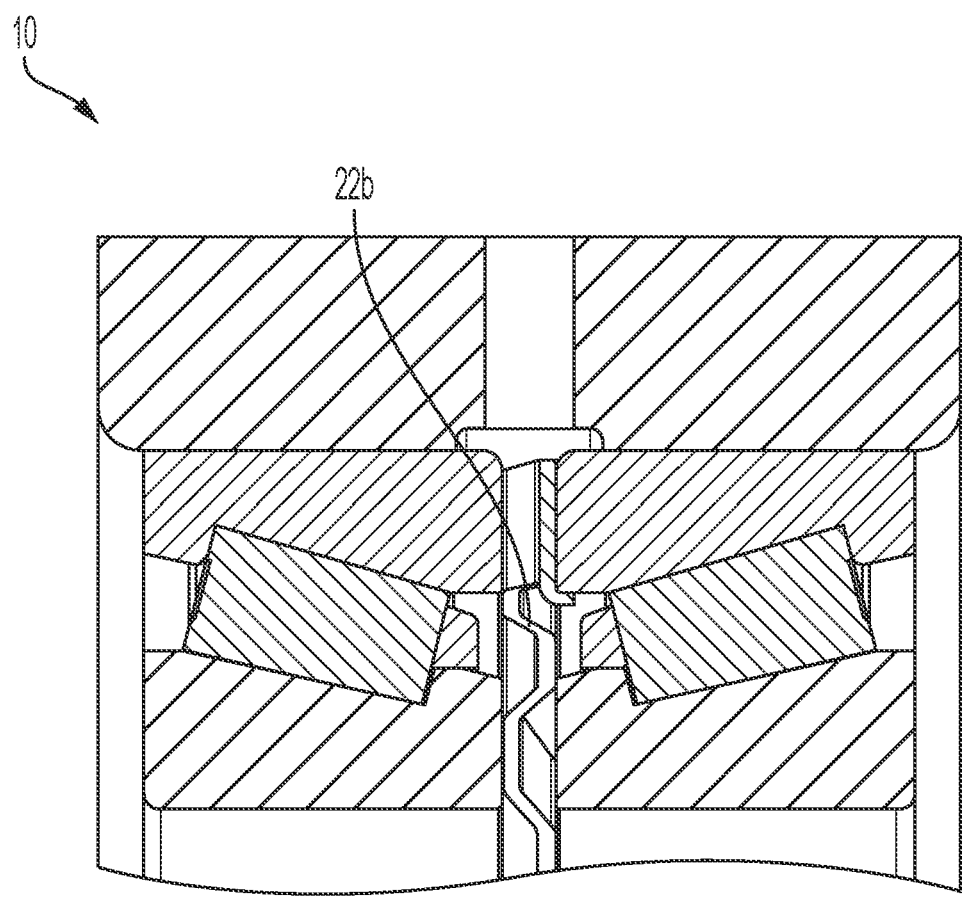
FIG. 14 is a cross-sectional view of a bearing assembly including the thrust washer of FIG. 11.

Turning to FIGS. 9 and 10, another exemplary thrust washer 22a is illustrated with additional axially extending tabs 66 extending in an opposite direction than tabs 64. The tabs 64 and 66 engage respective bearings 18a and 18b to maintain a position of the thrust washer 22a.

In FIGS. 11-14, another exemplary thrust washer 22b is illustrated. In this embodiment, the ridges/channels 44/48 have non-parallel sidewalls 56. The sloped sidewalls 56 make the washer 22b less stiff while enhancing shock absorbing capability. The slope angle of the sidewalls 56 can be adjusted based on application needs. The steeper the transition slope, the stiffer the washer will be. It should be appreciated that for heavy duty applications, a steepest slope of 90° (e.g., thrust washers 22 or 22a) is used.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 bearing assembly
14 housing
18a bearing
18b bearing
22 thrust washer
22a thrust washer
22b thrust washer
26a outer ring
26b inner ring
28 cage
30 rolling elements
34 ports
40 thrust washer body
44 ridge
48 channel
52 base wall
56 side wall
60 contact surface
64 tab
66 tab
A1 axial side
A2 axial side

What is claimed is:

1. A thrust washer comprising:
an annular washer body surrounding a central axis, the washer body having first and second opposite axial sides, each axial side including a plurality of alternating radially-extending ridges and channels, and at least one axially-extending tab on an inner diameter thereof.

2. The thrust washer according to claim 1, wherein a ridge of the first axial side corresponds to a channel of the second axial side.

3. The thrust washer according to claim 2, wherein each of the channels have a U-shape cross-section having a base wall and first and second sidewalls extending from the base wall.

4. The thrust washer according to claim 3, wherein the first and second sidewalls are parallel to each other and extend at 90-degree angles from the base wall.

5. The thrust washer according to claim 3, wherein the first and second sidewalls extend from the base wall at an angle greater than 90 degrees.

6. The thrust washer according to claim 1, wherein the ridges of each of the first and second axial sides define contact surfaces of the first and second sides, and wherein an areal extent of the contact surfaces of the first and second sides is equal.

7. The thrust washer according to claim 1, wherein each of the first and second axial sides has between 5 and 18 channels.

8. The thrust washer according to claim 1, wherein the annular washer body is stamped metal, and wherein the metal is heat-treated metal.

9. A bearing assembly comprising:
a housing;
first and second bearings supported in the housing; and
a thrust washer supported in the housing between the first and second bearings, wherein the thrust washer includes:
an annular washer body surrounding a central axis, the annular washer body having first and second axial sides, each axial side including a plurality of alternating radially-extending ridges and channels, and at least one axially-extending tab on an inner diameter of the thrust washer, the at least one axially extending tab cooperating with a surface of the first or second bearing to locate the thrust washer.

10. The bearing assembly according to claim 9, wherein the housing includes at least one hole extending in a radial direction for the flow of oil to an interior of the assembly, and wherein the thrust washer is axially aligned with the at least one hole.

11. The bearing assembly according to claim 9, wherein a ridge of the first axial side of the thrust washer corresponds to a channel of the second axial side of the thrust washer.

12. The bearing assembly according to claim 9, wherein each of the channels of the thrust washer have a U-shape cross-section having a base wall and first and second sidewalls extending from the base wall.

13. The bearing assembly according to claim 12, wherein the first and second sidewalls of the thrust washer are parallel to each other and extend at 90-degree angles from the base wall.

14. The bearing assembly according to claim 12, wherein the first and second sidewalls of the thrust washer extend from the base wall at an angle greater than 90 degrees.

15. The bearing assembly according to claim 9, wherein the ridges of each of the first and second axial sides of the thrust washer define contact surfaces of the first and second sides engaged with respective surfaces of the first and second bearings, and wherein an areal extent of the contact surfaces of the first and second sides is equal.

16. The bearing assembly according to claim 9, wherein each of the first and second axial sides of the thrust washer has between 5 and 18 channels.

17. The bearing assembly according to claim 9, wherein the annular washer body is stamped metal, and wherein the metal is heat-treated metal.

18. The bearing assembly according to claim 9, wherein the first and second bearings are tapered roller bearings.

\* \* \* \* \*